United States Patent [19]
Verma et al.

[11] Patent Number: 5,528,232
[45] Date of Patent: Jun. 18, 1996

[54] METHOD AND APPARATUS FOR LOCATING ITEMS

[75] Inventors: Vikram Verma; Robert S. Reis, both of Palo Alto; Domingo A. Mihovilovic, Mountain View; Philip J. Keleshian, San Jose, all of Calif.

[73] Assignee: Savi Technology, Inc., Mountain View, Calif.

[21] Appl. No.: 247,182

[22] Filed: May 20, 1994

Related U.S. Application Data

[63] Continuation-in-part of Ser. No. 148,552, Nov. 8, 1993, which is a continuation-in-part of Ser. No. 710,825, Jun. 6, 1991, abandoned, which is a continuation-in-part of Ser. No. 538,546, Jun. 15, 1990, abandoned.

[51] Int. Cl.$^6$ ........................................... H04Q 1/00
[52] U.S. Cl. .................. 340/825.54; 340/825.49; 367/128; 33/714
[58] Field of Search .................. 340/825.54, 825.49; 367/118, 127, 128; 33/713, 714

[56] References Cited

U.S. PATENT DOCUMENTS

| | | | |
|---|---|---|---|
| 4,055,830 | 10/1977 | Wilson | 367/128 |
| 4,247,922 | 1/1981 | Jackson | 367/128 |
| 4,510,495 | 4/1985 | Sigrimis | 340/825.54 |
| 4,691,202 | 9/1987 | Denne | 340/825.54 |
| 4,924,450 | 5/1990 | Brashear | 367/118 |
| 5,191,328 | 3/1993 | Nelson | 367/127 |
| 5,194,860 | 3/1993 | Jones | 340/825.54 |
| 5,306,882 | 4/1994 | Gerwig | 367/127 |

Primary Examiner—Brian Zimmerman
Attorney, Agent, or Firm—Fliesler, Dubb, Meyer & Lovejoy

[57] ABSTRACT

A communication system that communicates for locating one or more tags in a time and energy efficient manner. The tags are positioned in a communication region and are located by a locator. The tags are located through organized transmission and reception of signals between the tags and the locator. The locator locates and gives directions to tags from the locator using a radio link and a multi-channel ultrasonic acoustic link. The combination of linkages provides the means to determine the unobstructed bearing and distance between the locator and the tag and resolves multipath reflections.

18 Claims, 3 Drawing Sheets

METHOD AND APPARATUS FOR LOCATING ITEMS

CROSS-REFERENCE TO RELATED APPLICATIONS

This application is a continuation-in-part of U.S. patent application Ser. No. 08/148,552, filed Nov. 8, 1993, which is a continuation-in-part of U.S. patent application Ser. No. 07/710,825, filed Jun. 6, 1991, now abandoned, which is a continuation-in-part of U.S. patent application Ser. No. 07/538,546, filed Jun. 15, 1990, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is a communication method and apparatus for locating tags in a communication region and particularly for locating tags using a combination of radio and acoustic frequencies to provide range and direction from a reference location to one or more locations. The present invention is particularly useful where large numbers of tags are present in the communication region, where the locations or identities of the tags in the communication region are not necessarily known, where transport of the tags to and from the communication region is not necessarily restricted and where contentions among communications to and from tags need to be resolved in a time and energy efficient manner.

Tags can be attached to items such as parts, equipment, furniture, vehicles or to persons, to livestock or to any object having requirements to be located. Examples of processes using tag location are manufacturing, warehousing, inventory management, storage and transfer facilities and personal communication systems.

The communication region in which the communication occurs to locate tagged items may be small or large, cellular or single celled or may have other characteristics. For example, in some applications, items may be in widely separated locations in a warehouse or may be grouped closely together in a small storage container. Also, tags may be attached to compound items having components where each component is itself a tagged item. Examples of such compound items are manifests, bills of lading, manufacturing travelers, transport trailers, containers or similar elements.

A common requirement of manufacturing, transportation, repair, warehousing or merchandising enterprises is to locate and keep track of items. Normally this requirement necessitates both a location system that provides knowledge of the existence of items and a method to physically locate items for retrieval or inspection. While maintaining knowledge of the existence of items is often burdensome, locating an item for retrieval or inspection is frequently even more burdensome. Often, items which are known to be in a building (or other communication region) cannot be found without arduous searching. For example, a storage container that is at one location at one time is often not at that same location at another time. At times, items seem to vanish from an original location, all searching to no avail, only to turn up at a later time at another location that may be only a short distance from that original location or may be a long distance from the original location. These occurrences are typical of large or unstructured storage lots or warehouses.

Many location systems require an accurate inventory list together with a reference map, diagram or other location information associated with the inventory list. Manually created maps or diagrams have been used to keep track of items, however, where there is frequent movement of the items, the necessity of updating of maps or diagrams to maintain current location data becomes a burden and the cost of record keeping may become excessive.

Automated means of updating inventory lists and location diagrams have been proposed to address the record keeping costs, where for example:

(1) optical bar code readers in warehouses and supermarkets monitor and track inventory in generalized areas;

(2) magnetic stripe cards track the movement of persons at public transportation control points; and (3) radio frequency tags monitor tagged goods through electronic portals at retail establishments.

All of these examples utilize information to maintain location diagrams current, however, they implement the location process in what can be considered the reverse order. That is, the order is first to locate the item and then to record the present location of the item into the system. If the item cannot be located, then it is either presumed missing or a more extensive search is undertaken. With adequate time and a static warehouse (where items are not frequently moved), repeated searching will eventually ascertain the location of missing items. However, in many situations, there is not sufficient time to make a diagram or map, for example, in a shipping area where items are staged before forwarding, or in a deployment area where items that are brought in and stored at one time must be located and shipped at a subsequent time. In situations where items must quickly be located and retrieved, the search time required to locate items is frequently excessively long. Manual, diagram or map methods, as applied to item location and retrieval, are therefore inherently limited to structured, relatively stable storage environments so that search time is minimized.

In general, retrieving an item often requires both the knowledge of the location of the item relative to a reference location and directions as to how to proceed from the reference location to the location of the item. If vertical stacking is used, the directions should also include the level or height where the item may be found. An inventory list showing that the item exists is often not sufficient to locate the item, particularly if the item is in a large warehouse or storage yard. Although diagrams, maps or similar information indicating item locations may be useful, such information is frequently unavailable or not current.

Therefore, there is need for a method of locating items in regions without any pre-existing information as to the items's location other than, perhaps, the knowledge that the item is present in the region. A further desired feature of the location method is the ability to locate an item knowing only its serial number or other unique item identification. Such a method is needed to provide inventory status, location and other information.

Systems providing location information in unstructured situations where there is neither the time nor the resources to create and maintain location diagrams have been proposed. For example, radio direction systems designed to provide direction information are frequently used to determine location. Such radio direction systems employ antennas having field patterns that provide a high degree of signal amplitude resolution relative to antenna direction. These radio direction systems, however, are not practical in reflective (multipath) signal environments such as occur in or around buildings or in close proximity to the ground. In such environments, differentiating between the direct (unreflected) and indirect (reflected) multi-path radio signals is difficult since transit time differences between direct and multipath radio waves is on the order of one nanosecond per foot of path difference. The task of resolving the multipath signals is made even more difficult when the distance between the locating equipment and the object being sought is short (on the order of one hundred feet or less).

Procedures and equipment have been developed for use where multipath radio waves exist. In general, such equipment operates to analyze the combined radio signals and to statistically select the desired path from the reflected path. However, the methods employed are applicable generally only in long range situations or where the necessary computational time and resources are available and are cost-effective. For many applications, however, it is not practical to resolve by radio means the multipath signals typically found in a warehouse or storage yard.

Radio systems which employ multiple locators to provide triangulation information for item location are also limited in accuracy due to multipath effects. Additionally, proposed systems have been limited to the horizontal plane.

Even where the multipath problem is overcome, location systems still have not performed well because the penetrating characteristics of radio waves prevent formulation of practical directions from the reference location to the item location. If the item is behind a wall or other barrier, a radio system indicates a path through the barrier rather than an open pathway around the barrier.

The ideal locating system is one which gives practical instructions about a traversable path from the reference location to the item location. Often this traversable path is not a traversable direct line-of-sight path to the item location but rather the shortest unobstructed path to the item. This desired traversable path, the travel-path, is comprised of a travel-bearing and a travel-range.

Travel-range is the shortest unobstructed distance that the user of the locating system needs to travel to the item. Travel-bearing is the direction in which the user needs to travel from the instant position to most effectively reduce the remaining travel-range. These definitions are applied to the common situation wherein the observer is located in an obstructed environment such as an office suite with interior walls and doorways or a warehouse with product stacked or shelved in the surrounding area. If the desired item is located on the other side of an intervening wall or behind a row of stacked merchandise, it is preferable that the locating system not instruct the user to travel through the walls or the shelf structure but rather through one or more open doorways or aisles.

What is needed is a locating system that gives the user practical instructions as to travel-range and travel-bearing that the user needs to travel to reach the desired item, that is, to give the user the travel-path to the item. Additionally, the system should direct the user to the level or height where the item may be found when storage involves vertical stacking or shelving. The locating system must also reject multipath reflections which report ambiguous direction and must also be usable in all environments.

Prior art locating systems are not fully satisfactory. Prior art locating systems are concerned with either determining the distance to an object from a reference location or determining the instant location of a moving object with respect to a plurality of fixed references.

The Leyden patent (U.S. Pat. No. 3,566,348) discloses a ranging method using infrared and acoustic means to determine the distance from an observer to a spontaneous release of energy, specifically an explosion. The device uses an infrared sensor to detect the explosive release of energy, such detection initializing a counter. When the sound of the explosion reaches the device, the counter is stopped and the distance computed based on the time difference and the speed of sound. The direction is evident in this situation.

The Jones patent (U.S. Pat. No. 4,136,794) and the Kobayashi patent (U.S. Pat. No. 4,751,689) both disclose an acoustic ranging system (embodied as an apparatus to determine the distance to a pole located at a golf hole). The player uses an instrument to send a radio signal to the pole which then sends an acoustic signal back to the player. The time travel of the acoustic signal provides the information needed to compute the distance from the player to the pole. These methods provide useful information only if there is a direct line of sight to the pole as they do not afford any information as to the direction of the pole. In the Jones patent, misdirection of the signal from the player either gives distance to the wrong pole or does not give a distance reading. Kobayashi overcomes this limitation by sending a pole address as part of the radio signal. However, in either case, if the pole not within sight, direction is not evident.

The Hunt patent (U.S. Pat. No. 3,731,273) and the Schorum patent (U.S. Pat. No. 5,054,005) both teach methods of determining the location of a mobile station by generating a radio signal and energizing a spark gap at the mobile position. A plurality of fixed stations receive the signals, each determining the time difference at it's unique location of arrival between the energy from the spark and the radio wave. This art is concerned only with the position of the mobile station with respect to the fixed receivers.

The Edwards patent (U.S. Pat. No. 5,142,506) teaches the use of unique signatured acoustic waves to determine the ordinal coordinate system position of a mobile transmitter with respect to fixed receivers. This art is directed to the location of pointing instruments for use in plotting equipment.

The De Bruyne patent (U.S. Pat. No. 4,758,691) presents an apparatus for determining the position of a movable object with respect to two fixed acoustic sources. This patent is concerned with the accurate position determination of a computer accessory with respect to fixed references, the device to be used in controlling the cursor on a computer screen.

None of the prior art address or demonstrate methods or apparatus capable of determining the bearing of a target item from a reference location nor do they teach methods of determining the path (that is, range, bearing and height) to an item.

SUMMARY OF THE INVENTION

The present invention is a communication system that communicates for locating one or more tags in a time and energy efficient manner. The tags are positioned in a communication region and are located by a locator. The tags are located through organized transmission and reception of signals between the tags and the locator. The number of and the locations of the tags (and associated items) within the communication region are not necessarily known to the locator.

The present invention locates and gives directions to tags from the locator using a radio link and a multi-channel ultrasonic acoustic link. The combination of linkages provides the means to determine the unobstructed bearing and distance between the locator and the tag and resolves multipath reflections. Incorporating a logarithmic amplifier and a narrow band coherent demodulator for amplitude, phase and frequency qualification, the present invention is capable of resolving path differences of less than one foot, thus providing a practical short range object-locating system.

Range is determined by measuring the transit time of an ultrasonic acoustic signal launched from the locator and received at the tag. Time synchronization for the measurement is provided by a time-coincident radio signal launched by the locator. From the difference between the radio signal transit time and the acoustic signal transit time, range is computed knowing the speed of sound. Range is further refined by the fact that ultrasonic energy does not effectively penetrate obstacles such as walls or cabinets or other solid items but instead is reflected off of or absorbed by such obstacles. Ultrasonic acoustic energy seeks to propagate through the open air, that is, through pathways, doorways and other unobstructed ways between the locator and the tag. In this manner, unobstructed range (sometimes called "travel-range") is determined.

Bearing is computed by repeating the travel-range measurement using a second ultrasonic transducer on the locator located a short distance from the first transducer and noting the difference in the time measurements. Applying triangulation formulae to the combination of the values reported by the two range measurements and the distance between the two transducers then provides unobstructed bearing (sometimes called "travel-bearing"). Since the measurement process automatically incorporates the non-penetrating characteristic of ultrasound waves, the immediate direction indicated by the locator will be an unobstructed free path or travel-bearing around an obstruction, for example, through a doorway or around a wall.

Processing advantage is also gained through the use of directional acoustic transducers. In the preferred embodiment, piezoelectric horns direct the energy in the forward direction. This technique suppresses ambiguous directional responses from tags located behind the locator and also assists in resolving multipath reflections.

The present invention employs the batch collection process also described in the above-identified cross-referenced application. The batch collection process is comprised of a plurality of collection periods, each collection period comprising a listen period and an acknowledge period. In the batch process, the quantity of collection periods and the durations of the listen periods are controlled individually, effectively resolving communication contentions and providing the means to communicate with and determine direction to a large number of tags in an orderly, time and energy efficient manner.

During the listen period of each collection period, each of the tags transmits a communication to the locator once. During any particular listen period, only a subset of tags is likely to successfully communicate to the locator because, for large numbers of tags, tag transmissions often collide. To enhance the probability that communications will be successful, the communication period for each tag is relatively small compared with the full listen period and the periods for all tags are distributed over the full listen period.

During the acknowledge period for each collection period, the locator individually acknowledges in a batch all tags that successfully communicated during the preceding listen period. The acknowledge period is interference free since tags are permitted to transmit only during the listen period and are required to remain silent during the acknowledge period. Each acknowledge signal directs the addressed tag not to communicate during subsequent collection periods during the current batch session and instead to enter a quiescent state, therein to remain until a subsequent batch collection process is started. The preferred embodiment of the present invention uses battery powered tags and defines the quiescent state as a low-power or sleep state thereby conserving battery power.

In an embodiment of the present invention where the locator and tags share the same common communication channel, the locator makes no attempt at transmitting acknowledge signals during the listen period, instead continuing to receive the transmissions from as many tags as can be detected during the listen period, storing them for batch processing. The process of storing for batch processing ensures that during the listen period when incoming transmissions are present, no collisions in the communication channel are caused by the locator attempting to send acknowledgment signals over the same channel used by the tag transmissions. The present invention also inhibits repeated transmissions from the same tag during the same listen period, and rather forces an unacknowledged tag in one listen period to wait until the subsequent listen period to again transmit, thereby further avoiding collisions.

The foregoing and other objects, features and advantages of the invention will be apparent from the following detailed description in conjunction with the drawings.

DETAILED DESCRIPTION

Figure 1:
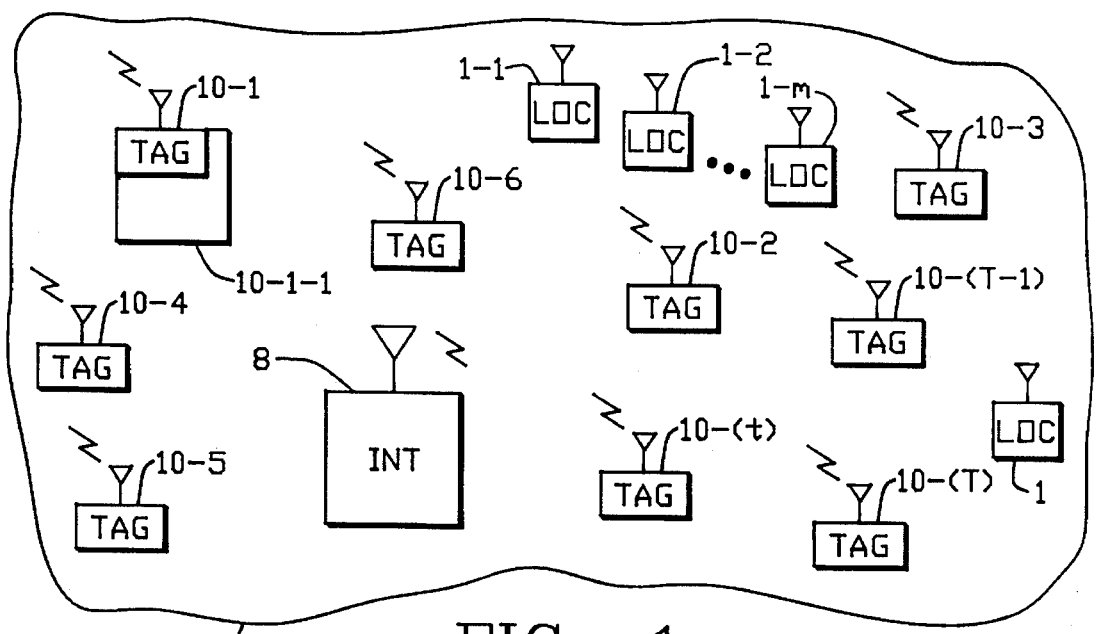
FIG. 1 depicts a communication region formed of one cell in which a locator and an interrogator communicate with a plurality of tags.

FIG. 1—Communication System

In FIG. 1, a communication region is shown as a single cell 3 that includes a plurality T of tags 10 as tags 10-1, 10-2, ..., 10-(t), ..., 10-(T-1), 10-(T), that communicate with an interrogator 8 of the type described in the above-identified cross-referenced application and with a locator 1, which is like interrogator 8 and specially adapted for locating tags. Locator 1 and/or interrogator 8 and tags 10 form a communication system that operates in the communication region of cell 3. The communication region in typical embodiments is enclosed within a radius of less than one mile from the interrogator 8 and typically contains 50 to 5000 of the tags 10. The cell 3 contains items and each item typically has a tag 10 attached by adhesive, clip or other convenient binder so that locating, tracking, identifying or communicating with a tag is the same as locating, tracking, identifying or communicating with the attached item.

For purposes of illustration, the tag 10-1 of FIG. 1 is associated with the item 10-1-1 of FIG. 1. Each of the other tags 10 is similarly associated with items which for clarity are not shown. Each of the tags 10 transmits and receives communications to and from the interrogator 8 and locator 1. Interrogator 8 and locator 1 also transmit and receive communications with the tags 10.

Many types of transmitters and receivers (sometimes called "transmitters/receivers" or "transceivers") can be used for the tags 10, interrogator 8 or locator 1. Such devices may employ infrared, acoustic, radio frequency, optical or magnetic means and the communication medium may be wire, optical fiber or air. In preferred embodiments, very high frequency (VHF) radio frequency is used in an air communication medium so that the tag portability, transmitter power, antenna size requirements and device range capability are satisfactory for local communication ranges suitable for warehouses, buildings, storage yards and other similar local regions.

Figure 2:
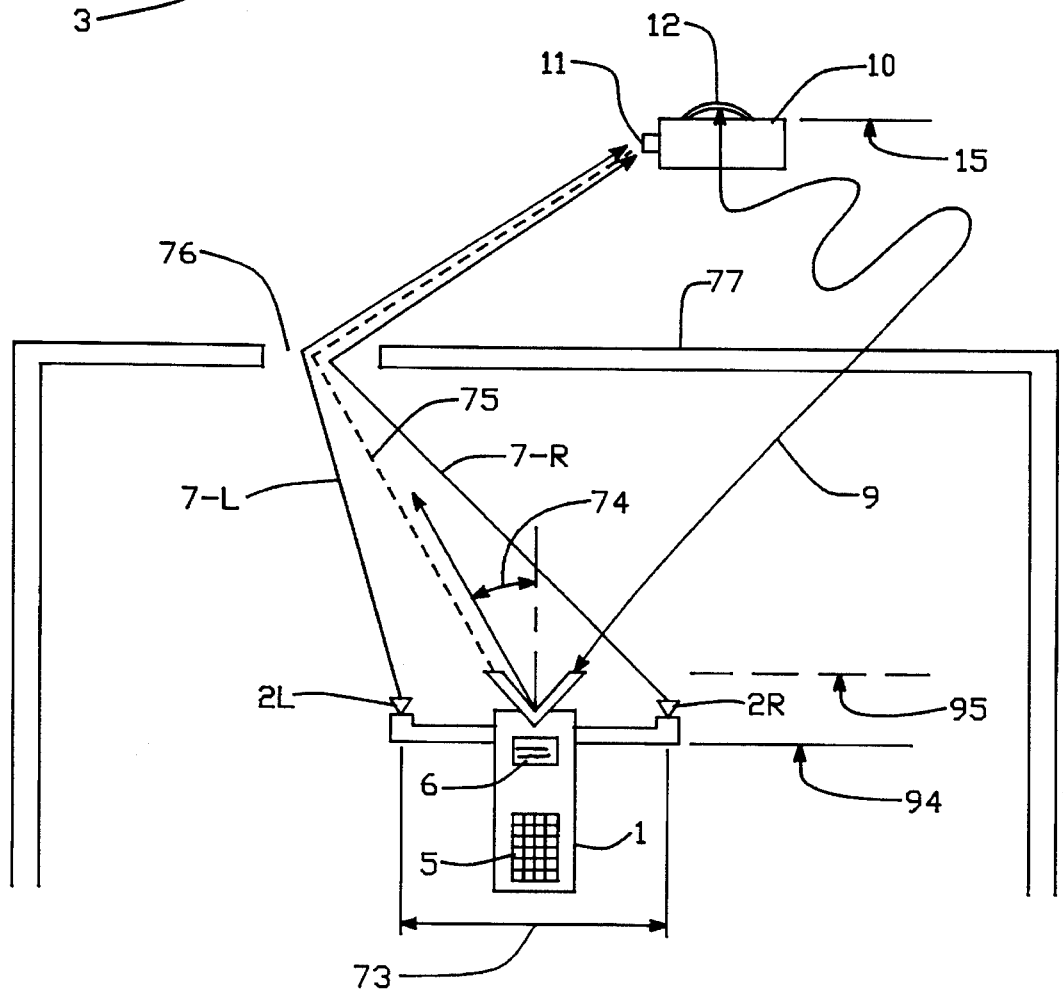
FIG. 2 depicts a locator and a single tag linked in communication.

Locator—Tag—FIG. 2

Referring now to FIG. 2, locator 1 and a tag 10-1 from FIG. 1 are shown where tag 10-1 is a representative one of the tags 10 of cell 3 of FIG. 1.

One of the operations of the location apparatus of FIGS. 1 and 2 is to determine and identify the travel-path between the current position of locator 1, at any particular time, and a tag 10-1 at the same particular time where tag 10-1 is representative of any one or more of the tags 10 of cell 3. In FIG. 2, locator 1 is a portable embodiment of an interrogator 8 of FIG. 1. In this illustration, a wall 77 is shown between the position of tag 10-1 and the position of locator 1. This placement is arbitrary, however, for the purpose of this explanation and may represent placement for any of the tags 10 of FIG. 1.

Determination of the travel-path is achieved by executing two separate distance measuring sequences and combining the results. Each sequence determines the distance from a different acoustic transducer of locator 1. The transducers are located at the reference location, in the preferred embodiment at the locator 1, and at a known offset distance from each other.

Mounted as part of the locator 1 are radio antenna 4, acoustic transducers 2L and 2R, a keypad 5 for user input and a display 6 for visual information output to a user. To operate the locator 1, one or more commands are entered to the locator 1, for example, via keypad 5. Information about task accomplishment appears on display 6. The tag includes a radio antenna 12 and acoustic transducer (microphone) 11. The locator and tag communicate by means of radio waves 9 between antennas 4 and 12 and by means of acoustic waves 7L from the left transducer 2L and acoustic waves 7R from right transducer 2R, both acoustic waves communicating from the locator 1 to the tag transducer (microphone) 11.

In FIG. 2, the travel-path from the present location 94 of locator 1 to the present location 15 of tag 10-1 is through an opening 76 in wall 77. The acoustic waves 7L and 7R travel from acoustic transducers 2L and 2R, respectively, to and through opening 76 in wall 77 and from opening 76 to microphone 11 of tag 10-1. The travel-range 75 and travel-bearing 74 are determined by locator 1 using the transit times of the acoustic signals and the separation distance 73 between locator transducers 2L and 2R.

In FIG. 2, assuming that locator 1 has moved to a new location 95, the travel-path from the new location 95 to the location 15 of tag 10-1 is still through opening 76 in wall 77. The new acoustic waves 7L' and 7R' from location 95 travel from the new location of acoustic transducers 2L and 2R, respectively, to and through opening 76 in wall 77 and from opening 76 to microphone 11 of tag 10-1. The new travel-range 75' and travel-bearing 74' are determined by locator 1 using the transit times of the acoustic signals and the separation distance 73 between locator transducers 2L and 2R. As locator 1 is moved to each new location, like location 95, the new travel-range and travel-bearing are calculated. Of course, the converse of this situation could also occur, that is, locator 1 may remain stationary and instead tag 10-1 may move to a new location. In this case also, locator 1 calculates the new travel-range and travel-bearing to tag 10-1 using the new transit times of the acoustic signals and the separation distance 73.

Figure 3:
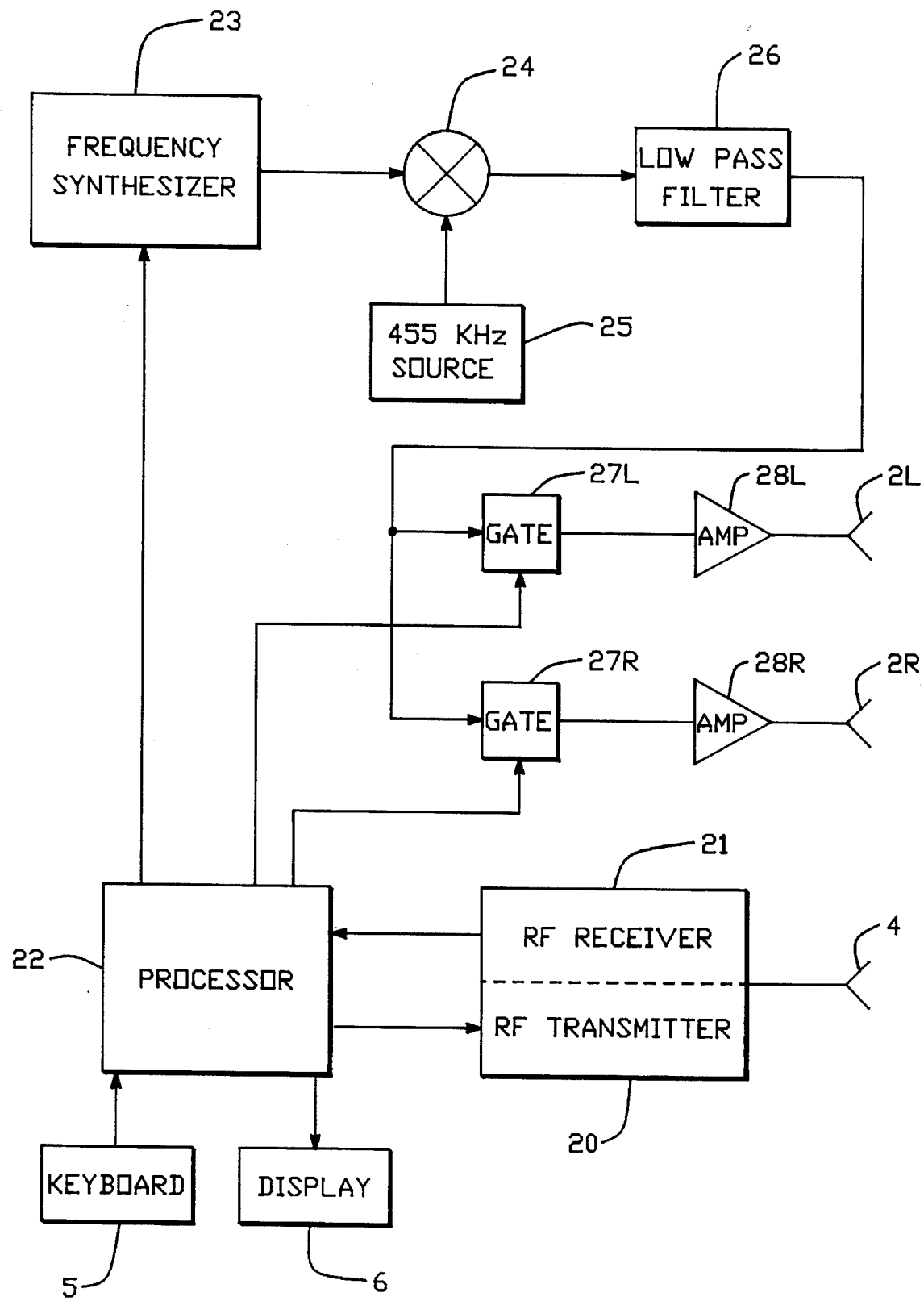
FIG. 3 depicts a block diagram of a preferred embodiment of the locator.

Locator—FIG. 3

FIG. 3 illustrates further details of a locator 1 which includes a locator processor 22 connected to receive the keyboard 5 input and connected to provide an output to display 6 for interaction with a user. The locator processor 22 provides output to radio frequency (RF) transmitter 20 and receives input from the RF receiver 21, both of which connect to RF antenna 4 for RF communication between the locator 1 of FIG. 3 and tag 10-1 of FIG. 2. The locator processor 22 is connected to provide an output to frequency synthesizer 23 to set synthesizer 23 to a frequency value corresponding to a selected acoustic frequency (AF) plus an intermediate frequency (IF). The output of the frequency synthesizer 23 is connected to mixer 24 together with the output from IF frequency generator 25. The output of mixer 24 is connected to pass through a low pass filter 29 and then as an input to modulators 27L and 27R. Processor 22 controls modulators 27L and 27R by means of controls 26L and 26R, respectively. The outputs of modulators 27R and 27L are connected to amplifiers 28R and 28L, respectively, and in turn to the acoustic transducers 2R and 2L, respectively.

In a preferred embodiment, processor 22 has an internal instruction code memory 18. The processor 22 executes locator sequencing code stored in the memory 18 which controls the transmission and reception of information between the locator 1 and tags 10 of the system of FIG. 1. The memory 18 also stores tag commands that are to be transmitted to the tags for controlling the operation of the tags.

Processor 22 is also connected to external memory 19. Memory 19 typically stores configuration and other data associated with the locator functions. Memory 19 is typically an EEPROM memory. The processor 22 in one embodiment includes both internal memory 18 and external memory 19 that together constitute the locator memory. However, the locator memory can be either internal or external or can be both as shown.

Figure 4:
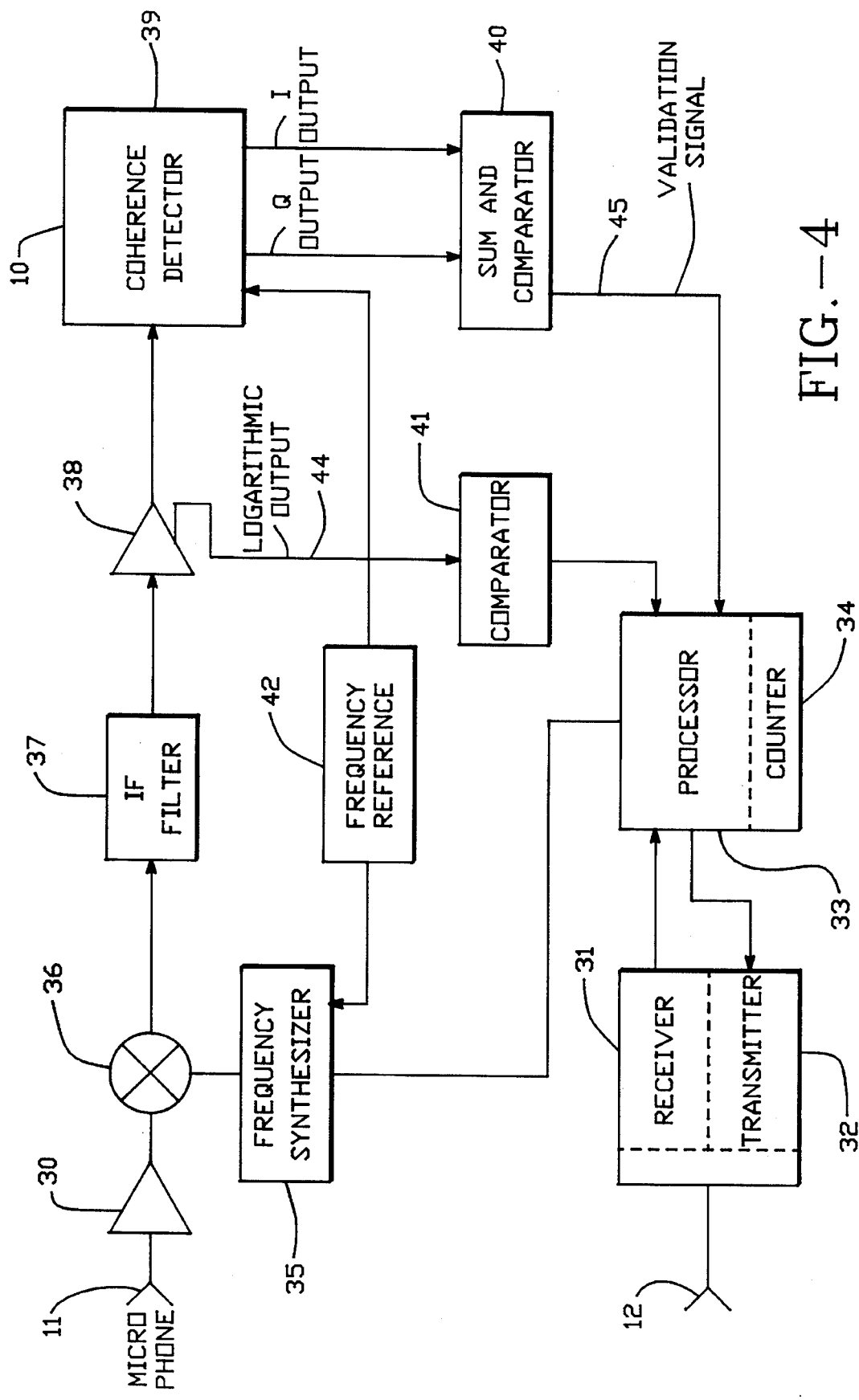
FIG. 4 depicts a block diagram of a preferred embodiment of the tag.

Tag—FIG. 4

Referring to FIG. 4, tag 10 includes a tag processor 33 connected to set the frequency of frequency synthesizer 35 according to a commanded code. Synthesizer 35 is set to the specified acoustic AF frequency plus an intermediate IF frequency, 455 Khz in the preferred embodiment, generated by frequency reference 42. Processor 33 is also connected to and operates to reset and start a counter 34. Processor 33 is also connected to RF receiver 31 and RF transmitter 32 which in turn connect to RF antenna 12.

Acoustic signals are received by microphone 11 and passed to acoustic receiver and amplifier 30 which in turn connects to mixer 36. Mixer 36 combines the amplified acoustic signal from amplifier 30 with the output of frequency synthesizer 35 to produce an IF signal to IF filter 37. The IF filter 37 connects to an amplifier 38 having both a logarithmic output line 44 and a limiting output line 43.

The logarithmic output 44 of amplifier 38 connects to comparator 41 which has a preset internal value for comparison with the logarithmic output 44. The comparator 41 connects to signal processor 33 for signaling processor 33 to halt counter 34.

The limiting output 43 of amplifier 38 is connected to coherence detector and demodulator 39 which also receives in-phase (Iref) and quadrature (Qref) reference signals from frequency reference 42. The coherence detector and demodulator 39 separately combines and forms in-phase (Iout) and quadrature (Qout) output signals and outputs these to comparator 40. Comparator 40 operates to provide the validation signal on line 45 to processor 33 if the Iout and Qout output signals from detector 39 indicate a qualified acoustic signal has been received from amplifier 38.

In a preferred embodiment, processor 33 has an internal instruction code memory 47. The processor 33 executes tag sequencing code stored in the memory 47 which controls the transmission and reception of information between the tags 10 and locator 1 of the system of FIG. 1. Processor 33 is also connected to external memory 48. Memory 48 typically stores configuration and other data associated with the tag functions. Memory 48 is typically an EEPROM memory. The processor 33 in one embodiment includes both internal memory 47 and external memory 48 that together constitute the tag memory. However, the tag memory can be either internal or external or can be both as shown.

Tag 10 also includes power source 46, in the preferred embodiment a battery, supplying power to all components of the tag.

Operation

The operation of the communication system of FIG. 1 includes both radio frequency communication and acoustic frequency communication for many different types of operation. Radio frequency communication alone is used, for example, for an inventory operation that takes inventory of the tags in the communication region. Radio frequency communication in combination with acoustic frequency communication is used, for example, for a locating operation to determine the location of tags in the communication region.

When there are a large number of tags in the communication region, it is important for the system to employ efficient methods of communication to avoid or reduce communication collisions which result in a loss of information during a communication. One efficient method of communication employs a batch collection protocol that controls communications between an interrogator and batches of tags. The communication is in sequence between an interrogator and first, second and subsequent batches of tags until all tags requiring communication have been processed. Using batch collection, the likelihood of communication collisions is reduced, particular when large numbers of tags are in the communication region.

Inventory Operation—RF Communication And Batch Collection

Referring to FIG. 1, interrogator 8 or locator 1 are commonly employed for many different types of operation. In inventory operation, in accordance with the above-identified cross-referenced application, locator 1 or interrogator 8 is employed to perform the inventory process using batch collection and other protocols that are one-to-many when communication occurs between an interrogator 8 (or a locator 1) and many tags 10 in an environment where one or more of the tags 10 may attempt to communicate simultaneously.

TABLE 1 is representative of the instruction set of an interrogator 8 (and a locator 1). The HELLO and SET_WINDOW commands are broadcast commands that function to initiate the collection of the ID codes from all tags within range of the interrogator. These broadcast commands are examples of one-to-many command operations, that is, communication from the locator to many tags. The ALL_SLEEP command is a broadcast command that directs all awake tags except the tag identified in the argument field (the argument field includes the tag ID code) to resume the quiescent or sleep state and directs the identified (addressed) tag to remain awake (enabled) in order to receive a subsequent directed or one-to-one command, for example, a BEEP_ON command.

Referring now to LIST 1 and LIST 2 and FIGS. 1, 2, 3 and 4, the following sequence demonstrates locator 8 employing the batch collection process to determine the inventory of tags 10 of cell 3 of FIG. 1.

LOCATOR STATE 59

Referring to LIST 1 and FIG. 3, the IDLE state 59 represents the idle state of the locator 1. From this state, the locator commences different operations that are executed as sessions. The IDLE state is implemented in a conventional manner in locator 1, for example, processor 22 executes an idle loop that branches when an operation is to be started. Although tag location is a significant operation of the invention, many other operations are possible, including communicating with tags 10 for inventory purposes or for other purposes.

The communication system remains in the idle state until a user requests a session for performing an operation. In the preferred embodiment, the user may initiate a tag location session, a tag inventory session or other type of session by entering a respective command via keyboard 5. On receiving the request, the processing in the locator 1 will pass from IDLE state 59 to TEST SESSION TYPE state 60.

LOCATOR STATE 60, 60-1, . . . , 60-S

In state 60, locator 1 tests to determine the type of session to be executed. State 60 first tests to determine if a LOCATE TAGS operation is to be performed. Assuming a LOCATE TAGS operation is to be performed, a YES result of the test sends the processing to SEND WAKE-UP state 61. Assuming a LOCATE TAGS operation is not to be performed, a NO result of the test sends the processing to the next TEST SESSION TYPE state 60-1.

The TEST SESSION TYPE state 60-1 tests to determine if a TAG INVENTORY session is to be performed. Assuming a TAG INVENTORY operation is to be performed, a YES result of the test sends the processing to the SEND WAKE UP state 61. A NO result of the test sends the processing to the next TEST SESSION TYPE state 60-S.

The TEST SESSION TYPE state 60-S again is a test for a particular session type. The test session processing continues for any number S of TEST SESSION TYPE tests up to TEST SESSION TYPE state 60-S.

LIST 1 demonstrates serial testing in order to determine the session to be executed, however, other ways of determining sessions can be employed. For example, condition code branching, vectoring, or table look-up methods can be used.

For purposes of explanation of the batch collection process, assume now that locator 1 has received a request for a TAG INVENTORY session from the user via keyboard 5.

Processing after leaving the IDLE state 59 advances to TEST SESSION state 60, to TEST SESSION state 60-1 and then continues to SEND WAKE-UP state 61.

LOCATOR STATE 61

In SEND WAKE-UP state 61, the locator transmits a WAKE-UP signal to wake-up sleeping tags. In the preferred embodiment, the WAKE-UP signal comprises a VHF radio signal modulated at 30.5 Khz, sent for a period of 3.492 seconds.

For tag inventory using batch collection and for many other sessions, the constant interrogation of all tags within radio range of the locator 1 (or other operation requiting high-power consumption by the tags) is not desired. Low-power operation is important for battery-operated tags to extend battery life in the tags. In the present example, it is assumed that all tags normally are in a low-power standby mode (sleep mode) and are awakened only as the need arises.

After having sent the WAKE-UP signal, the locator advances to INITIALIZE VARIABLES state 62.

LOCATOR STATE 62

In INITIALIZE VARIABLES state 62 the contents of variable CYCLECOUNT 80 are initialized to 1, the contents of table TAG TABLE 83 are cleared and the contents of variable CREDIT 84 is initialized to a predetermined value C. In the preferred embodiment, the value C equals 1. The locator then the advances to the SEND COMMAND state 63.

TAG STATE 90

Referring now to FIG. 4 and LIST 2, the tags 10 are quiescent in the low-power sleep mode in SLEEP state 90. RF receiver 33, on receipt of the WAKE-UP command from locator 1 of FIG. 3, activates the processor 33 awakening the tag from its low-power state and the tag advances to INITIALIZE TIMER state 91.

TAG STATE 91

In INITIALIZE TIMER state 91, the tag initializes variable WAIT TIMER 89 to the value W where W has a value of 30 seconds in the preferred embodiment. The tag continues to LISTEN FOR COMMAND state 92.

TAG STATE 92

In LISTEN FOR COMMAND state 92, the tag checks for the presence of a command from the locator. If a command has been received, the tag advances to TEST COMMAND TYPE state 93. If a command is not present, the tag advances to CHECK WAIT TIMER state 92-1.

TAG STATE 92-1

In CHECK WAIT TIMER state 92-1, the variable WAIT TIMER 89 is decreased by one count.

If the variable equals zero, this condition indicates that the tag has not detected a command from the locator, most probably because the tag is too distant from the locator to detect the command and that therefore there is no reason for the tag to continue listening. The tag branches to SLEEP state 90 resuming the sleep mode.

If the variable is greater than zero, this condition indicates that there still exists time for a command to be received and the tag remains in LISTEN FOR COMMAND state 92.

LOCATOR STATE 63

Referring now to LIST 1 and FIG. 3, in SEND COMMAND state 63, the locator sends a command. In the inventory batch collection process, the command is one of the HELLO or SET_WINDOW commands of TABLE 1 and defines the LISTEN period duration. The duration of the LISTEN period is determined by accessing an array indexed by the contents of variable CYCLECOUNT 80. From the array, the locator obtains the duration of the LISTEN period. The array has been preloaded with values related to the number of tags expected in the range of the locator. This code together with the processor is bandwidth code and is means for controlling the bandwidth of the collection periods. The bandwidth code sets the bandwidth of each collection period by setting the duration of each of the respective listen periods.

In the preferred embodiments, the maximum one of the values is 6840 milliseconds, with the remaining values decreasing in a manner such that progressive values are approximately one-half the previous value, reaching a limit value of 285 milliseconds. In the preferred embodiments, the array is arranged such that progressively smaller values are loaded at progressively larger index positions in the array. In other embodiments, other values may be used for the LISTEN period durations where such selection of values is dependent on the number of tags expected to be in the range of the locator or determined after analysis of tag collection statistics, such collections having been performed previously, for example by interrogator 8 of FIG. 1.

The locator sends the command using RF transmitter 20 and then advances to COLLECT state 66.

TAG STATE 93, 93-1, . . . , 93-S

Referring now to LIST 2 and FIG. 4, the tag enters TEST COMMAND TYPE state 93 having detected the receipt of a command. In state 93, the tag tests to determine the type of command that has been received. State 93 first tests to determine if a HELLO or SET_WINDOW command has been received. Assuming a HELLO or SET_WINDOW command has been received, a YES result of the test sends the tag to DELAY state 94. Assuming a HELLO or SET_WINDOW was not received, a NO result of the test sends the processing to the next TEST COMMAND TYPE state 93-S.

The TEST COMMAND TYPE state 93-1 tests to determine if a SLEEP command has been received. Assuming a SLEEP command has been received, a YES result of the test sends the processing to SLEEP state 90. A NO result of the test sends the processing to the next TEST COMMAND TYPE state 93-S.

The test command processing continues for any number S of TEST COMMAND TYPE tests up to TEST COMMAND TYPE state 93-S. While LIST 2 has included serial testing in a certain typical sequence in order to determine the session to be executed, other ways of determining sessions can be employed. For example, different sequences of command testing, condition code branching, vectoring, table look-up or other methods can be used.

For purposes of explaining the batch collection process, it is assumed that tag 10 has received a HELLO or SET_

WINDOW broadcast command from the locator, in which event the tag advances to DELAY state 94.

TAG STATE 94

The tag enters DELAY state 94 having detected a HELLO, SET_WINDOW or INTERRUPT_HELLO command. If the command is the SET_WINDOW command, the tag stores the LISTEN time value accompanying the command and then computes a time delay value for the response. If the command is a HELLO or INTERRUPT_HELLO command, the tag computes the time delay value for the response using the default LISTEN time value, in the preferred embodiment the default time value is 285 milliseconds.

On the first SET_WINDOW command received by the tag after the WAKE-UP command, the delay is computed associating the tag address code (tag ID) with the LISTEN duration value. In the preferred embodiment, this association is a hash algorithm manipulation of the tag address (tag ID).

After the first SET_WINDOW command that the tag receives after the WAKE-UP or on receipt of a HELLO or INTERRUPT_HELLO command, the tag chooses a random time delay within the LISTEN time. In the preferred embodiment, the internal clock of the processor 2 of each tag 8 is used as a randomizing element for the tag.

When the delay has been computed as described above, the tag executes the delay period and then advances to SEND RESPONSE state 95.

TAG STATE 95

In SEND RESPONSE state 95, the tag sends its address code (tag ID) back to the locator. The response contains the tag address (ID code) and status code information. The tag status code information may include information as to the battery state or other information. Additional data may be sent to the locator as data bytes in the format described according to command type as indicated in TABLE 1. The tag then advances to LISTEN FOR COMMAND state 91 to await further communication from the locator.

LOCATOR STATE 66

Referring again to LIST 1 and FIG. 2, the locator receives the tag responses in COLLECT state 66. The tag responses are received using RF receiver 21. When a tag is detected, the locator receives the tag address code, placing the tag code in table TAG TABLE 83 at the position indexed by the tag address. Also placed at the table position is the signal strength indication and other status information. If the data is received in error, the data is discarded. The locator continues in COLLECT state 66, listening for tag responses, remaining in COLLECT state 66 until the LISTEN period expires. The locator then advances to CHECK NEW TAGS state 67.

LOCATOR STATE 67

The locator, in CHECK NEW TAGS state 67, examines the table TAG TABLE 83. All tags that respond to the broadcast command sent in SEND COMMAND state 63 will have been entered into table TAG TABLE 83 in COLLECT state 66.

If any additional tags were entered into the table in COLLECT state 66, the locator advances to RESTORE CREDITS state 68.

If no additional tags were entered into the table during COLLECT state 66, the locator branches to DECREASE CREDITS state 69 wherein the contents of variable CREDIT 84 is decreased one count. The locator then advances to CHECK CYCLE COUNT state 71.

LOCATOR STATE 68

In RESTORE CREDITS state 68, the contents of variable CREDIT 84 are initialized to the initial value C to indicate that new tags have responded to transmission and that collections are to continue. The locator then advances to ACKNOWLEDGE state 70.

LOCATOR STATE 69

In DECREASE CREDITS state 69, no additional tags were entered into the table during the COLLECT state 66. The contents of variable CREDIT 84 are decreased by one. The locator then advances to CHECK CYCLE COUNT state 71.

LOCATOR STATE 70

In ACKNOWLEDGE state 70, since new tags were entered into the table TAG TABLE 83 during the COLLECT state 66, all such new tags are sequentially each sent an ACKNOWLEDGE command, in the inventory function a directed command, specifically the SLEEP command of TABLE 1. The locator then advances to CHECK CYCLE COUNT state 71.

LOCATOR STATE 71

The locator in CHECK CYCLE COUNT state 71 increases variable CYCLE COUNT 80 by one count. The value of variable CYCLE COUNT 80 is then compared with the limit MAXCYCLE. In the preferred embodiment, MAXCYCLE is equal to 20.

If the variable is equal to the limit, the locator has completed the requisite number of batch collection periods. The locator returns to IDLE state 59.

If the variable is less than the limit, the locator branches to SEND COMMAND state 63.

TABLE 1

| Code | Name | Arguments | Description |
| --- | --- | --- | --- |
| 00000000 | HELLO | None | Initiate collection of all awake tags using default listen period. |
| 11000011 | SLEEP | 3 byte ID | Instructs the addressed tag that is has been heard and that it can go to sleep. |
| 11000101 | BEEP_ON | 3 byte ID | Instructs the addressed tag to turn on the audible alarm. Returns: Tag ID plus status code. |
| 11000110 | BEEP_OFF | 3 byte ID | Instructs the addressed tag to turn off the audible alarm. Returns: Tag ID plus status code. |

TABLE 1-continued

| Code | Name | Arguments | Description |
|---|---|---|---|
| 11001001 | PLACE | 3 byte ID<br>+ count N<br>+ address (M)<br>+ N bytes of data<br>+ parity byte | Store N bytes in EEPROM of addressed tag starting at addr M. Returns: Tag ID plus status code. |
| 11010010 | SQUAWK | 3 byte ID<br>+ counter (N)<br>+ address (M) | Retrieve N bytes from addressed tag EEPROM starting at address M. Returns: Tag ID + N bytes of data + parity byte covering the data. |
| 11011011 | ALL_SLEEP | 3 byte ID | Puts all awake tags to sleep except the one with the specified ID. |
| 10001110 | SET_WINDOW | Byte N | Set listen window in all tags to N times 55 msec. Default N = 1. Command initiates a hello cycle. |
| 00001001 | RANGE_H_CMD | 3 byte ID | Instructs addressed tag to return its ID and high range value; |
| 00001010 | RANGE_L_CMD | 3 byte ID | Instructs addressed tag to return its ID and low range value; |
| 00000111 | PING | freq code AF | Initiate range measurement to addressed tag, send acoustic pulse after delay. |
| 00001100 | DF_REPORT | none | DF hello command. Collects range values from tags. Returns: Tag ID + time Hi + timer Lo |
| 00000011 | INTERRUPT_HELLO | None | Hello directed to all tags that have the Int A in the status byte set. Returns: Tag ID. |

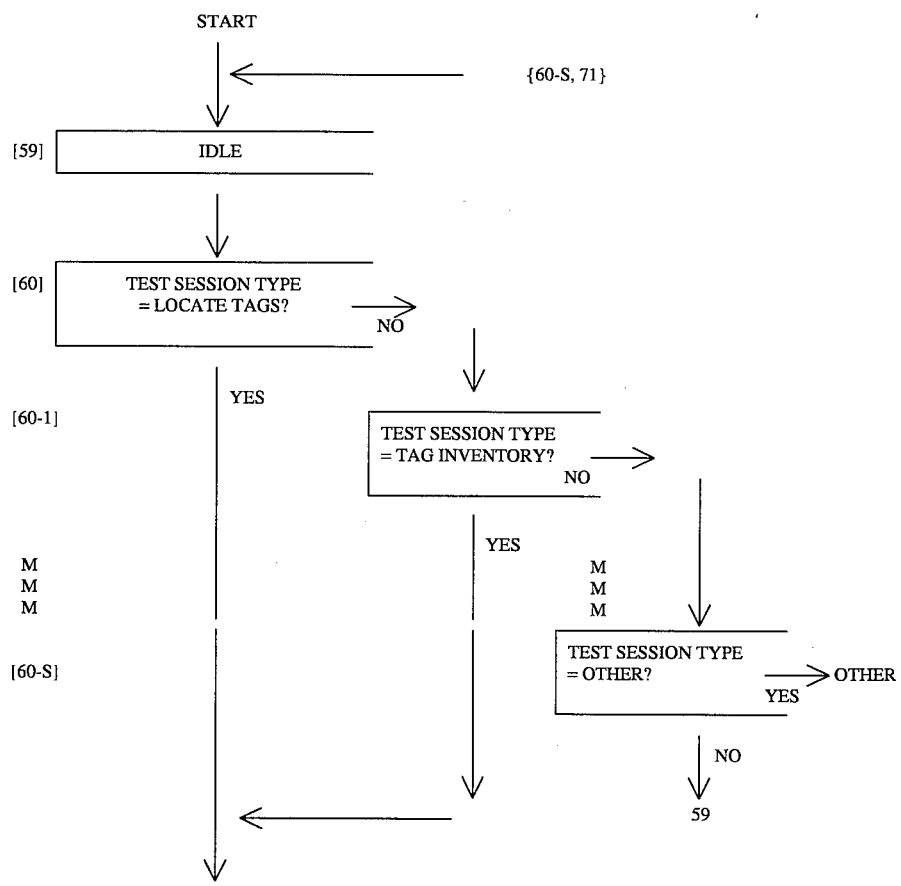

LIST 1
LOCATOR batch collection sequencing

-continued
LIST 1
LOCATOR batch collection sequencing
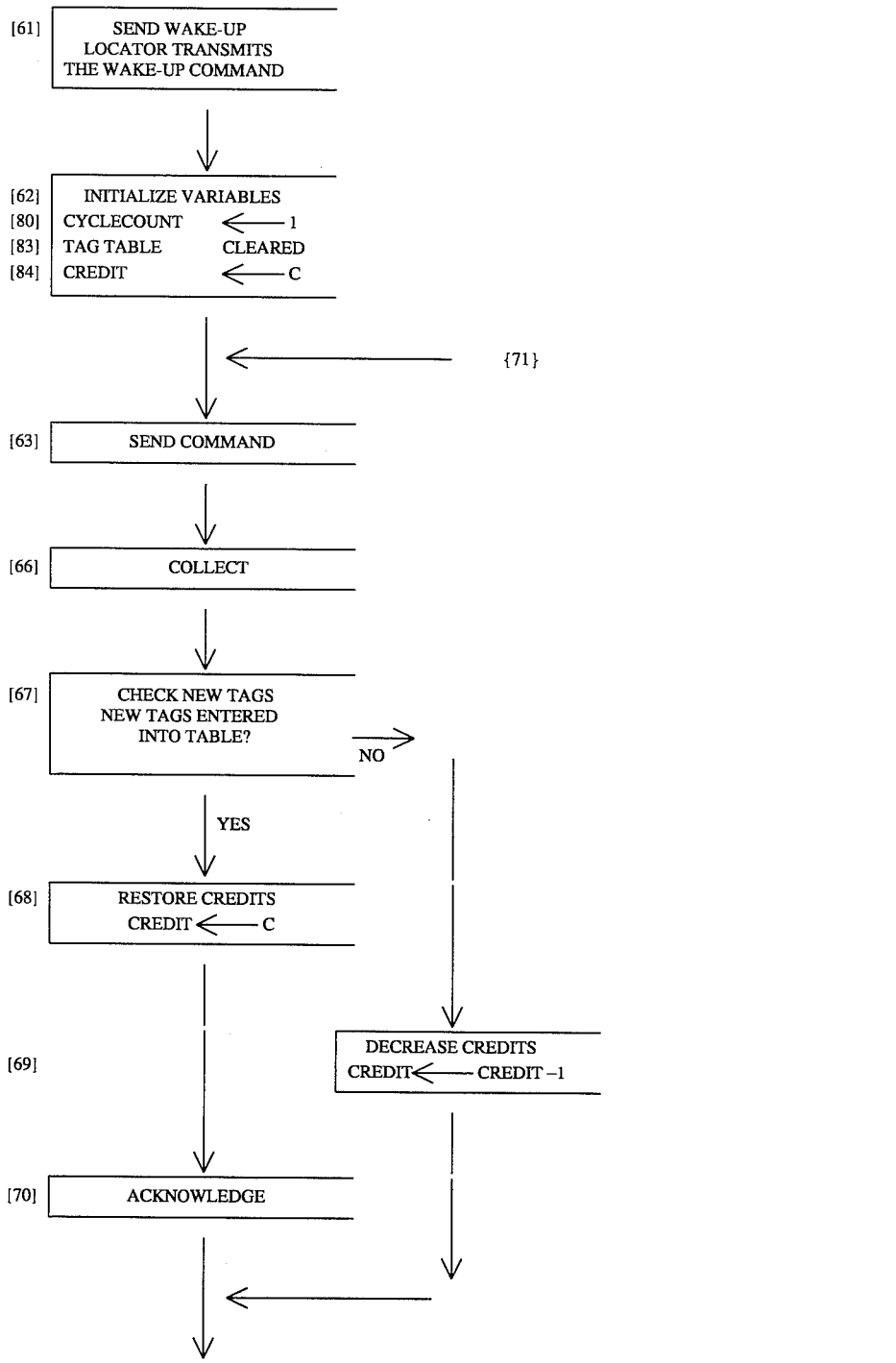

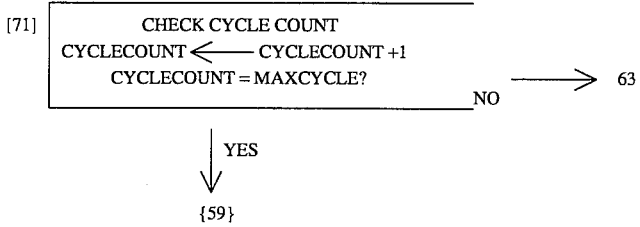
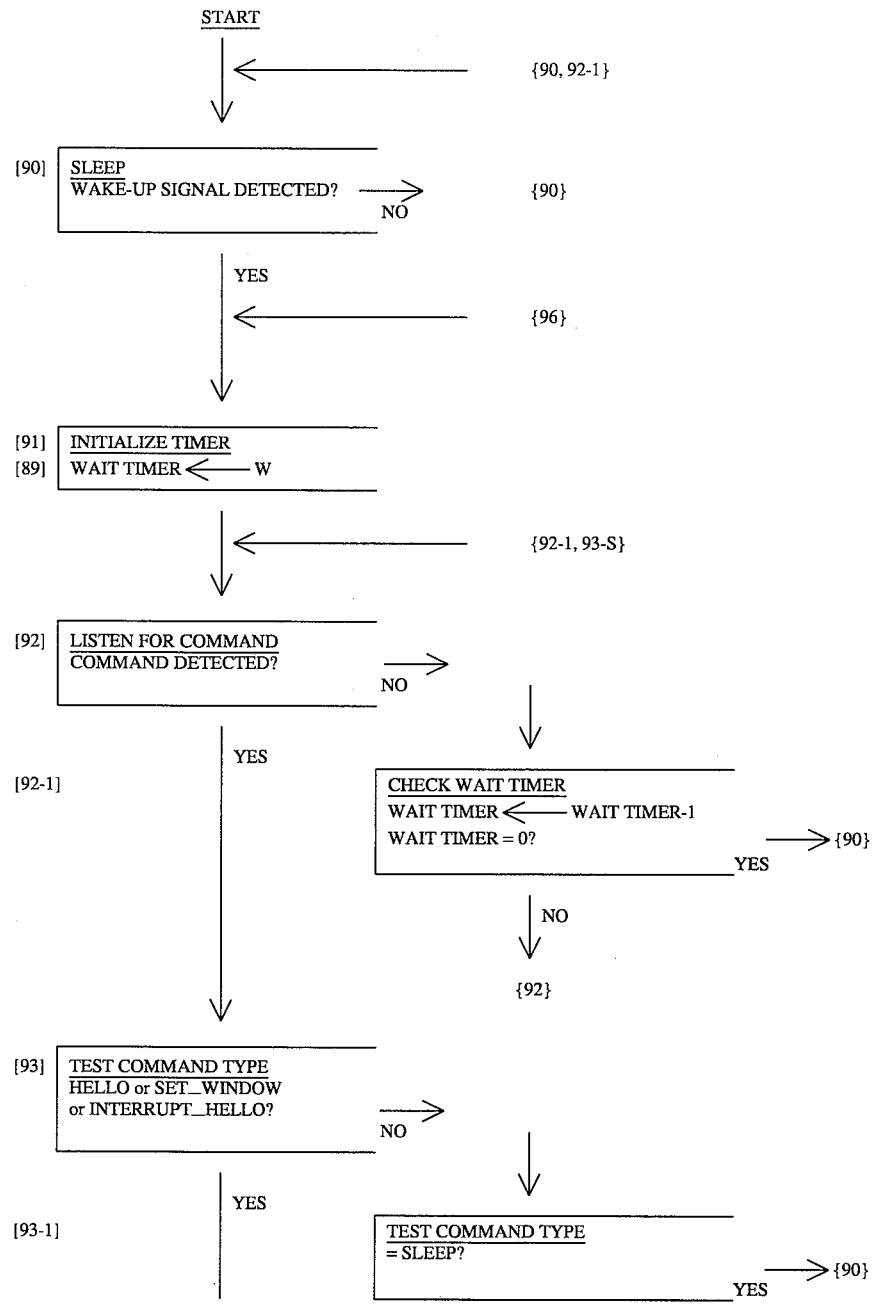

-continued
LIST 2
TAG batch collection sequencing

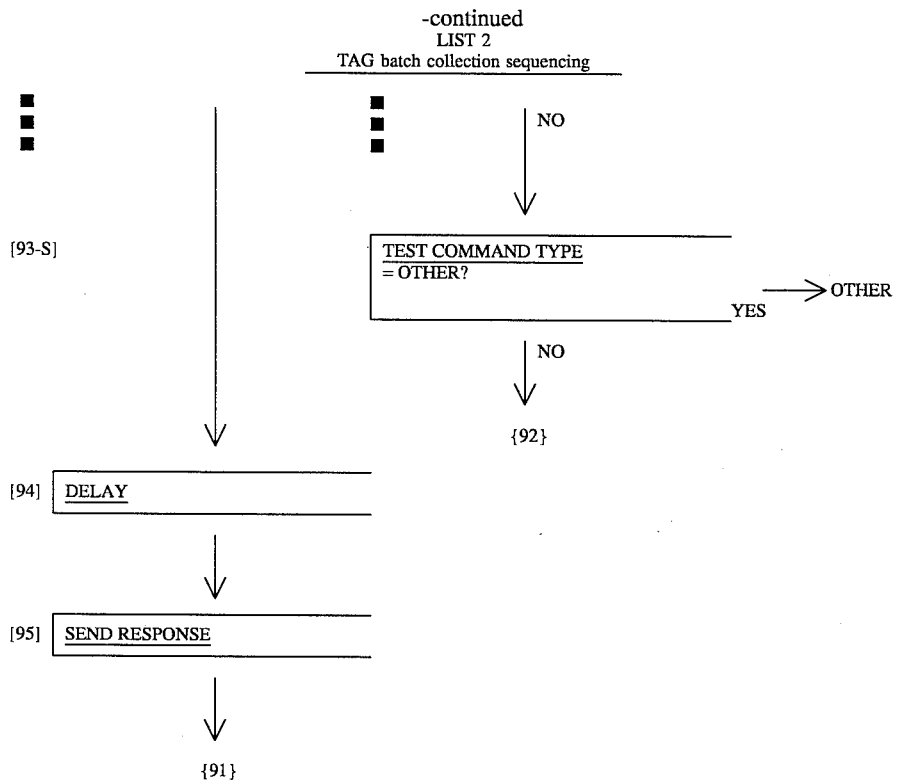

Locating Operation—RF and Acoustic Communication

The locator 1 operates to locate one of the tags 10 of FIG. 1 or to locate a plurality of tags 10. A user (for manual operation) or an input device (for automatic operation) enters the identity or identities of the tag(s) 10 to be located and then commands the locator 1 to begin the locating operation. The batch collection process is employed to resolve any collisions that might occur during the communications between multiple tags 10 and the locator 1, thus providing a fast and efficient location operation.

Referring to FIGS. 1 through 4 and the CODE LISTING, the following sequence describes the process whereby locator 1 is employed to locate a particular one of the tags 10 of FIG. 1, namely tag 10-1. The locating process, employing the batch collection protocol, operates to locate a plurality of the tags as may be ascertained through detailed examination of the commands and functions listed in TABLE 1 and the following CODE LISTING.

The user or other input source requests the location of tag 10-1 of FIG. 1 by entering the tag ID code for tag 10-1 followed by the location command into locator 1. The following sequence occurs after locator 1 has received a command to determine the travel-path to tag 10-1 of FIG. 1. The following location process is implemented using sequences of commands from the command set of TABLE 1 as represented in detail in the CODE LISTING.

a) In FIG. 3, locator processor 22 sets frequency synthesizer 23 to a value corresponding to a selected acoustic frequency (AF) plus an intermediate frequency (IF). In the preferred embodiment, the IF frequency is 455 Khz and the AF frequency a value typically in the range from 15 Khz to 50 Khz. Selection of the audio frequency is either automatic with the command or specified by the user. The user can cause the system to execute an iterative process to determine the system responsiveness over a range of acoustic frequencies.

b) The output of the frequency synthesizer 23 is combined at mixer 24 with the output of IF frequency generator 25. The output of mixer 24 is passed through the low pass filter 29 and presented as the input to modulators 27L and 27R.

c) Processor 22 sends a WAKE-UP command to all tags 10 of FIG. 1 by means of RF transmitter 20 and antenna 4. In accordance with the present invention, the WAKE-UP command awakens all tags 10 in the range of the locator and begins a batch collection process.

d) During the listen periods of the batch collection, the ID code of each of the awake tags 10 is collected. During the acknowledge periods, processor 22 uses the ALL_SLEEP command to acknowledge in a batch all tags identified during the previous listen period. The ALL_SLEEP command, the argument of which is the ID code of tag 10-1, causes all tags save tag 10-1 to resume the SLEEP state while tag 10-1 remains awake, awaiting further command.

e) Referring now to FIG. 3, processor 22 sends a PING command though RF transmitter 20 with the code of the selected acoustic frequency as the argument. After a predetermined delay to allow the tag frequency synthesizer 35 of FIG. 4 to stabilize, 500 microseconds in the described embodiment, processor 22 enables modulator 27L with a modulation signal, in the preferred embodiment a ten millisecond pulse, by means of modulation control 26L. Modulator 27L modulates the acoustic signal from low pass filter 29. The modulated signal passes to the left acoustic amplifier 28L and then to transducer 2L, exiting the locator 1 as acoustic signal 7L. The acoustic signal 7L will tend to seek a clear path, in this example through doorway 76 of FIG. 2, to reach the tag 10-1.

f) The tag 10-1 of FIG. 1 is a representative one of tags 10, one of which is shown in greater detail in FIG. 4. In the subsequent description, reference to tag 10 of FIG. 4 also refers then to tag 10-1 of FIG. 1. Referring now to FIG. 4, tag processor 33, on receipt of the PING command, sets synthesizer 35 to the AF frequency specified in the command plus an intermediate (IF) frequency, 455 Khz in the preferred embodiment. Processor 33 also resets and starts counter 34 on receipt of the PING command. Since radio frequency energy travels at the speed of light, the transmission and reception of the PING command effectively marks at tag 10-1 the time of launch of the modulated acoustic signal at locator 1.

g) At the terminus of its travel, acoustic signal 7L is received at the tag 10 of FIG. 4 (tag 10-1 of FIG. 1) by microphone 11 and passed to acoustic receiver and amplifier 30. Mixer 36 combines the amplified acoustic signal with the output of frequency synthesizer 35 to produce an IF signal. The IF signal is passed through filter 37 to amplifier 38. The logarithmic output 44 of amplifier 38 is sent to comparator 41. When comparator 41 determines that the logarithmic output 44 signifies the arrival of the modulated acoustic signal, comparator 41 signals processor 33 to halt counter 34. The accumulated count in counter 34 then represents the acoustic signal travel-time between locator 1 and tag 10-1 of FIG. 1.

h) Validation of the acoustic signal is accomplished by passing the limiting output 43 of amplifier 38 to coherence detector and demodulator 39, wherein the signal is separately combined with the in-phase (Iref) and quadrature (Qref) signals from reference generator 42. The separately combined signals are sent as Iout and Qout to comparator 40 which will signal processor 33 by means of validation signal line 45 if a valid acoustic signal is present.

i) Processor 33, after a predetermined interval subsequent to comparator 41 signalling the arrival of an acoustic signal, tests the validation signal 45 from comparator 40. If the validation signal 45 is true, the value in counter 35 is transferred to an internal holding register. If the validation signal 45 is false, a zero value is transferred. The tag then enters a wait state, waiting for the DF_REPORT from the locator.

j) In FIG. 3, subsequent to the transmission of the PING command, the locator 1 waits a time interval sufficient to insure that the acoustic signal has been received by all tags in expected range, 100 milliseconds in the preferred embodiment, and then commences a batch collection process in accordance with the present invention, using the DF_REPORT command of TABLE 1 as the synchronizing command for the listen periods.

k) In FIG. 4, the tag receives the DF_REPORT command and, after delaying the time required according to the batch collection protocol, transmits the count value stored in counter 34 to the locator 1 during the listen period.

If the tag has not detected the acoustic signal when the DF_REPORT command is received or if the acoustic signal was invalid according to the test of validation signal 45 in step (i) supra, the count value will be zero.

l) Referring to FIG. 3, the first count value is received at RF receiver 21 and passed to processor 22. Processor 22 stores the count value in memory 19.

m) Processor 22 automatically initiates a second measurement sequence, repeating steps e through k above, with the exception that the right acoustic path, comprising control 26R, modulator 27R, amplifier 28R and transducer 2R, is employed to transmit the acoustic signal. The second count value, representing the travel time of acoustic signal 7R is received at RF receiver 21 and passed to processor 22 which stores the count value in memory 19.

n) Referring now to FIG. 2, processor 22 normalizes the two time count values, from the first sequence representing the distance travelled by acoustic wave 7L and from the second sequence representing the distance travelled by acoustic wave 7R, by subtracting the stabilizing delay time, from step (e) supra, from each of the count values. Processor 22 then applies the normalized time values to a location algorithm which is based on the separation distance 73 between transducers 2L and 2R. The resultant final calculation is the travel-bearing 74 to the tag.

o) Processor 22 determines travel-range 75 by factoring the average of the two normalized count values, representing the distances travelled by acoustic waves 7L and 7R respectively, with the propagation velocity of the acoustic wave. The travel-path component values (travel-range and travel-bearing) are then displayed on display 6. The non-penetrating characteristic of the ultrasonic waves will correctly indicate the travel-path as through doorway 76 and not through wall 77.

CODE LISTING
COPYRIGHT 1993 SAVI TECHNOLOGY, INC.

/*----------------------------------------------------------------

LOCATOR FUNCTIONS

----------------------------------------------------------------*/

```
    unsigned long time_A @ buffer[0] ;
5   unsigned long time_B @ buffer[7] ;
    unsigned long delta_spk @ buffer[5] ;
    unsigned long range @ buffer[9] ;
    unsigned long TOTAL_A ;
    unsigned long TOTAL_B ;

10  unsigned int speaker ;
    unsigned int sign ;
    unsigned int rest ;
    #define SPEAKER_A 0
    #define SPEAKER_B 1
15  #define POSITIVE 1
    #define NEGATIVE 0 void get_report() ;
    void df_filter() ;
```

CODE LISTING
COPYRIGHT 1993 SAVI TECHNOLOGY, INC.

```
       void eeerr_msg()
20     {
         lcd_clear() ;

show("Error writing EEPROM") ;

int_tenth_sec(100) ;
       }

25     /*----------------------------------------------------------

DF_INIT

----------------------------------------------------------

Read the frequency synthesizer value from eeprom and initialize the frequency synthesizer.

30     ----------------------------------------------------------*/ void df_init()
       {
         /*
           Read the frequency stored in eeprom.
35         If it is out of range set it to  7
           (40 khz)
         */
         freq = ee_read(FREQ_SYNTH) ;
         if (freq > 8)
```

CODE LISTING
COPYRIGHT 1993 SAVI TECHNOLOGY, INC.

```
40      { freq = 7 ;   /* 40 Khz */ if(!ee_write(freq,FREQ_SYNTH))

eeerr_msg() ;

}

45      syn_init(freq) ;       /* initialize the frequency synthesizer */

}

/*----------------------------------------------------------------

SEL_SPKA

-----------------------------------------------------------------

50      Turn speaker A ON

---------------------------------------------------------------*/ void sel_spkA()

{ control2 = control2 | 0b00000001 ;

55        set_latch2(control2) ;

}

/*----------------------------------------------------------------
```

CODE LISTING
COPYRIGHT 1993 SAVI TECHNOLOGY, INC.
DES_SPKA

```
------------------------------------------------------------

60     Turn speaker A OFF

------------------------------------------------------------*/ void des_spkA()

{ control2 = control2 & 0b11111110 ;

65       set_latch2(control2) ;

}

/*-----------------------------------------------------------

DES_SPKB

------------------------------------------------------------

70     Turn speaker B ON

-----------------------------------------------------------*/ void sel_spkB()

{ control2 = control2 | 0b00000010 ;

75       set_latch2(control2) ;

}

/*-----------------------------------------------------------
```

CODE LISTING
COPYRIGHT 1993 SAVI TECHNOLOGY, INC.

DES_SPKB

```
          ------------------------------------------------------------
80        Turn speaker B OFF
          ------------------------------------------------------------*/ void des_spkB()
          {
             control2 = control2 & 0b11111101 ;
85           set_latch2(control2) ;
          }

/*----------------------------------------------------------

SET_FREQ
          ------------------------------------------------------------
90        Set the frequency for the frequency synthesizer and turn on or off
          the two speakers.
          The arguments are :
             Frequency synthesizer value.
             Turn speaker A ON ( TRUE or FALSE )
95           Turn speaker B ON ( TRUE or FALSE )
          ------------------------------------------------------------*/
          void set_freq_syn()
          {
```

CODE LISTING
COPYRIGHT 1993 SAVI TECHNOLOGY, INC.

```
            syn_set_freq(get_byte()) ;

100     if (get_byte())

sel_spkA() ;

else des_spkA() ;

if (get_byte())

105         sel_spkB() ;

else des_spkB() ;

put1byte(ALL_OK) ;

}

110 /*-------------------------------------------------------------------

DO_PING_TAG

-----------------------------------------------------------------

Send the PING_HELLO_CMD to the tag.

It sends the PING_HELLO command followed by a byte specifying the 115 acoustic frequency and it sends a 10 msec acoustic pulse after that.

It receives back :

TAG_ID   (3 bytes)

TIMER_HIGH (1 byte)

TIMER_LOW  (1 byte)
```

CODE LISTING
COPYRIGHT 1993 SAVI TECHNOLOGY, INC.

```
120        CRC (checksum) ( 1 byte)

-------------------------------------------------------------*/ void do_ping_tag()

{ current_tx = default_tx ;

125         freq = ee_read(FREQ_SYNTH) ;

if (freq==8)

rest = 0 ;

else rest = 100 ;

130         syn_set_freq(freq) ;

SEND_1BYTE_CMD(PING_HELLO_CMD) ;   /* send the command code */ short_delay() ;

transmit_byte(freq|0xA0) ;         /* send the frequency value */

Disable_Tx() ;

135         current_tx = 3 ;

/* send acoustic pulse */ if ( speaker == SPEAKER_A )

sel_spkA() ;

else 140             sel_spkB() ;
```

CODE LISTING
COPYRIGHT 1993 SAVI TECHNOLOGY, INC.

```
         five_msec() ;

five_msec() ;

if ( speaker == SPEAKER_A)

des_spkA() ;

145      else des_spkB() ;

get_report() ;         /* get back the report from the tag */
     #if USE_LCD if (error_code==ALL_OK)

150         show1("OK    ") ;

else

{ show1("Err: ") ;

accumula_msg(error_code) ;

155        } endif

} /* ping_tag */

/*-----------------------------------------------------------
```

CODE LISTING
COPYRIGHT 1993 SAVI TECHNOLOGY, INC.
PING_TAG

160  `-----------------------------------------------------------------`

Send the PING_HELLO_CMD to the tag.

It read the speaker number from the pc and then it calls do_ping_tag to do a normal ping-reprot cycle

`-------------------------------------------------------------------*/`

165 
```
void ping_tag()
{
    speaker = get_byte() ;    /* read the speaker to use */
    do_ping_tag() ;           /* call the routine to do the actual ping */
}
```

170  `/*---------------------------------------------------------------`

GET_REPORT

`---------------------------------------------------------------`

This routine receives the report from the tag that comes in response to a ping command :

175    TAG ID  ( 3 bytes )

Timer Interval High

Timer Interval Low

Checksum

CODE LISTING
COPYRIGHT 1993 SAVI TECHNOLOGY, INC.

```
                                                                -*/
180     void get_report()

{ target_ID0 = 0xD0 ;

target_ID1 = 0xD0 ;

target_ID2 = 0xD1 ;

185       window_counter = 3 ;

load_cmp_regs();

expired = FALSE ;

select_rx(default_rx) ;

error_code = ALL_OK ;

190       if (wait_header() == 0 )    /* the header was received correctly */

{ if (rf_receive(3,ID))

{ if (rf_receive(3,buffer)) /* 2 + 1 parity */

195             { check_received_id() ; /* dfint.05c */ if (error_code==ALL_OK)  /* if ID is OK check message parity byte */ if ( buffer[2] != compute_checksum(2))

error_code = MESSAGEPARITY_PARITY ;

200             } /* the message was received correctly */
```

CODE LISTING
COPYRIGHT 1993 SAVI TECHNOLOGY, INC.

```
        else              /* error receiving num_byte+1 bytes */ error_code = MESSAGERX_ERROR ;

} /* ID received correctly */ else 205       error_code = IDRX_ERROR ;

} else  /* error receiving the header */ error_code = HEADER_ERROR ;

select_rx(3) ;

210 }

/*----------------------------------------------------------------

DRAW_ARROW

---------------------------------------------------------------

This routine draws an arrow indicating the direction of the tag

215 ----------------------------------------------------------*/ void draw_arrow(length)

{ lcd_clrline(4) ;

if (length > 90)

220     length = 0 ;
```

CODE LISTING
COPYRIGHT 1993 SAVI TECHNOLOGY, INC.

```
        if (sign == POSITIVE)

for ( i = 0 ; i < length / 10 ; i++ )

{ lcd_gotoxy(10+i,4) ;

225           lcd_write(0x7e) ;    /* draw -> */

} else for ( i = 0 ; i < length / 10 ; i++ )

{

230             lcd_gotoxy(10-i,4) ;

lcd_write(0x7f) ;    /* draw <- */

}

} void get_range()

235     {

/* range is average(time_A,time_B) */ range = time_A>>1 ;

range += time_B>>1 ;
```

CODE LISTING
COPYRIGHT 1993 SAVI TECHNOLOGY, INC.

```
        range >>= 2 ;    /* divide by 4 to avoid overflow in the next
240                     multiplication */ range *= 2 ;

range /= 9 ;

range <<= 2 ;    /* multiply by 4 */

/* write delta timer */
245     lcd_gotoxy(4,2) ;

show("d = ") ;

buffer[11] = range /10000 ;

nibble_msg(buffer[11]) ;

range %= 10000 ;

250     buffer[11] = range /1000 ;

nibble_msg(buffer[11]) ;

range %= 1000 ;

buffer[11] = range/100 ;

nibble_msg(buffer[11]) ;

255     range %= 100 ;

buffer[11] = range/10 ;

putc_msg('.') ;
```

CODE LISTING
COPYRIGHT 1993 SAVI TECHNOLOGY, INC.

```
           nibble_msg(buffer[11]) ;

range %= 10 ;

260        nibble_msg(buffer[10]) ;

show(" ft") ;

} void get_angle()

{

265        if (delta_spk<224)

{ delta_spk *= 25 ;

delta_spk /= 239 ;

goto angle_done ;

270          } if (delta_spk<462)

{ delta_spk -= 224 ;

delta_spk *= 32 ;

275             delta_spk /= 254 ;

delta_spk += 23 ;
```

CODE LISTING
COPYRIGHT 1993 SAVI TECHNOLOGY, INC.

```
            goto angle_done ;

} if (delta_spk < 580)

280     { delta_spk -= 462 ;

delta_spk *= 78 ;

delta_spk /= 240 ;

delta_spk += 53 ;

285     } angle_done:

}

/*----------------------------------------------------------------

COMPUTE_ANGLE

290    ----------------------------------------------------------------

This routine compute the angle for a tag and writes it to the lcd

-------------------------------------------------------------*/ void compute_angle()

{

295     /* write both timers */

/*
```

CODE LISTING
COPYRIGHT 1993 SAVI TECHNOLOGY, INC.

```
              lcd_line(2) ;

accumula_msg(buffer[0]) ;

accumula_msg(buffer[1]) ;

300           lcd_line(3) ;

accumula_msg(buffer[7]) ;

accumula_msg(buffer[8]) ;
         */
              if (time_B > time_A)

305              { sign = NEGATIVE ;

delta_spk = time_B - time_A ;

} else

310              { delta_spk = time_A - time_B ;

sign = POSITIVE ;

} if (delta_spk > 0x0244) /* more than 1.292 ft */

315              { delta_spk = 0 ;

int_tenth_sec(100) ;
```

CODE LISTING
COPYRIGHT 1993 SAVI TECHNOLOGY, INC.

```
         goto skip_computation ;

}

320      get_range() ;

/* convert from time_counts into angle */ get_angle() ;

skip_computation:

/* the final angle must be in buffer[6] */

325      draw_arrow(buffer[6]) ;

/* write angle */ lcd_gotoxy(4,3) ;

lcd_write(0xF2) ;   /* theta = */ show(" = ") ;

330      if (sign==POSITIVE)

putc_msg('+') ;

else putc_msg('-') ;

nibble_msg(buffer[6] / 100) ;
```

CODE LISTING
COPYRIGHT 1993 SAVI TECHNOLOGY, INC.

```
335        buffer[6] %= 100 ;

nibble_msg(buffer[6]/10) ;

buffer[6] %= 10 ;

nibble_msg(buffer[6]) ;

show(" deg") ;

340    }
```

```
/*-----------------------------------------------------------------

ANGLE_TAG

-------------------------------------------------------------------

This routine does two consecutive ping commands and it reports back
345    to the PC :

error_code ( 0 if everything is OK )

if error_code = 0 then begin

TIMER_HIGH for speaker A

350        TIMER_LOW for speaker A

TIMER_HIGH for speaker B

TIMER_LOW for speaker B end

------------------------------------------------------------------*/
```

CODE LISTING
COPYRIGHT 1993 SAVI TECHNOLOGY, INC.

```
355     void angle_tag()

{ speaker = SPEAKER_A ;

do_ping_tag() ;

int_tenth_sec(10) ;

360       if (error_code == ALL_OK)

{

/* store the results from the first report */ buffer[3] = buffer[0] ;   /* timer high */ buffer[4] = buffer[1] ;   /* timer low */

365         speaker = SPEAKER_B ;

do_ping_tag() ;

} rs_put_byte(error_code) ;

if (error_code == ALL_OK)
370       { compute_angle() ;

for ( i = 0 ; i < 5 ; i++)

{
```

CODE LISTING
COPYRIGHT 1993 SAVI TECHNOLOGY, INC.

```
                if (i==2) continue ;
375             rs_put_byte(buffer[i]) ;
            }
        }
        else
    #if USE_LCD
380         show("ERROR ") ;
    #else
            NOP() ;
    #endif
    }

385 /* return true if a key is pressed */
    int in_key()
    {
    #if USE_KBD
        if (keypressed())
390         {
            lcd_clear() ;
            int_tenth_sec(100) ;
            return(TRUE) ;
```

CODE LISTING
COPYRIGHT 1993 SAVI TECHNOLOGY, INC.

```
              }
395      else
              return(FALSE) ;
         #else
           return(FALSE) ;
         #endif

400      } void write_khz(freq)
         {
           show("Freq: ") ;
           /* convert to khz */
405        freq *= 5 ;
           freq += 5 ;
           nibble_msg(freq/10) ;
           nibble_msg(freq%10) ;
           show(" khz") ;
410      }

/*----------------------------------------------------------------
```

CODE LISTING
COPYRIGHT 1993 SAVI TECHNOLOGY, INC.
TEST_DF

```
---------------------------------------------------------------
    This routine runs forever to test the df operation.
    It does multiple pings and writes the angle to the LCD
---------------------------------------------------------------*/ void df_test()
{
    lcd_gotoxy(8,1) ;
    write_khz(ee_read(FREQ_SYNTH)) ;
    speaker = SPEAKER_B ;
    while (TRUE)
    {
        if (in_key()) return ;
        speaker = ! speaker ;
        do_ping_tag() ;
        if (in_key()) return ;
        int_tenth_sec(10);
        if (speaker == SPEAKER_B)
        {
            compute_angle() ;
            for ( i = 0 ; i < rest; i++)
            {
```

CODE LISTING
COPYRIGHT 1993 SAVI TECHNOLOGY, INC.

```
                int_tenth_sec(1) ;

435             if (in_key()) return ;

}

} else

{

440     /* store the results from the first report */ buffer[7] = buffer[0] ;   /* timer high */ buffer[8] = buffer[1] ;   /* timer low */

}

}

445 } if USE_KBD void dftag_main()

{ while (TRUE)

450   { lcd_clrline(1) ;

show(" Waiting Command..") ;

while (! keypressed())    /* wait for a key */
```

CODE LISTING
COPYRIGHT 1993 SAVI TECHNOLOGY, INC.

```
                ;
455     while(!find_key(&offset))
                ;
        int_tenth_sec(20) ;
        switch (offset)
            {
460         case 0x00 :
                    lcd_clear() ;
                    int_tenth_sec(20) ;
                    df_test() ;
                    lcd_clear() ;
465             break ;
            case 0x37 : lcd_clear() ;
                    freq = ee_read(FREQ_SYNTH) ;
                    if (freq < 8)
                    {
470                 freq++ ;
                    if (!ee_write(freq,FREQ_SYNTH))
                        eeerr_msg() ;
                    syn_set_freq(freq) ;
                    }
475             lcd_line(2) ;
```

CODE LISTING
COPYRIGHT 1993 SAVI TECHNOLOGY, INC.

```
              write_khz(freq) ;

break ;

case 0x47 : lcd_clear() ;

freq = ee_read(FREQ_SYNTH) ;

480           if (freq > 2)

{ freq-- ;

if (!ee_write(freq,FREQ_SYNTH))

eeerr_msg() ;

485             syn_set_freq(freq) ;

} lcd_line(2) ;

write_khz(freq) ;

break ;

490      case 0x10 : lcd_clear() ;

df_filter() ;

break ;

}

}

495   }
      #endif
```

CODE LISTING
COPYRIGHT 1993 SAVI TECHNOLOGY, INC.

```
/*------------------------------------------------------------

DF_SAMPLE

-------------------------------------------------------------

500     This routine runs forever to test the df operation.

It does multiple pings and writes the angle to the LCD

-----------------------------------------------------------*/ int do_both()

{

505         speaker = SPEAKER_A ;

do_ping_tag() ;

time_B = time_A ;

int_tenth_sec(10);

speaker = SPEAKER_B ;

510         do_ping_tag() ;

int_tenth_sec(10);

if (time_B>time_A)

{ sign = POSITIVE ;

515             delta_spk = time_B-time_A;

} else
```

CODE LISTING
COPYRIGHT 1993 SAVI TECHNOLOGY, INC.

```
            { sign = POSITIVE ;

520           delta_spk = time_A-time_B;

} if (delta_spk < = 0x244)

return(TRUE) ;

else 525         return(FALSE) ;

} void df_filter()

{ unsigned int good_ones ;

530     lcd_gotoxy(8,1) ;

write_khz(ee_read(FREQ_SYNTH)) ;

speaker = SPEAKER_B ;

TOTAL_A = 0 ;

TOTAL_B = 0 ;

535       good_ones = 0 ;

while (good_ones < 3 )

{
```

FURTHER AND OTHER EMBODIMENTS

The need to locate one or more tagged items arises in many diverse situations. For example, at times the need may be to locate and fetch an item while at other times the need may be to provide directions to an item for purpose of display on a chart. The present invention, employing the batch collection process and the acoustic locating features and sequences described above provides the means to locate one or more items. The location precision may range from a coarse approximation of location to a precise locating of an item. For example, greater location precision is achieved using a plurality of locators 1-1, 1-2, . . . , 1-n like locator 1 of FIG. 1, mounted in a pattern at fixed locations in the cell 3. The locators 1 like other interrogators are linked by wire or other means as described in the cross-referenced application. One of the locators such as 1-1 may send a command to trigger one of the other locators such as 1-2 to trigger the distance and direction operations. The greater the number of locators, the greater the precision. The inventory of the tags 10 results in gathering information that includes the signal strength of each individual tag as received at the locator 1. Signal strength information from locators provides information that is used, for example, to provide a location diagram.

Accurate position information for the plurality of tags is made available when locator functions are included with the interrogators, that is, the interrogators employ acoustic transducers. In one example, four acoustic transducers are used in combination to provide acoustic coverage of a complete circular or other pattern. The locating process uses such a combination of transducers to provide direction information from each locator to each tag thereby locating one or more of the tags according to the present invention. Multiple interrogators providing directional information produce accurate information about the location of the tags.

Another alternate embodiment of the invention transmits the radio frequency and acoustic frequency signals at different times, the time difference being designated as a time origination factor. This factor is subtracted from the measured values determined by the tag as part of the distance measurement calculation.

While the preferred embodiment uses RF communication, other means of communicating the tag result data to the locator are included, for example, by means of a hard connection (such as wire or fiber optic) between the locator and the tag.

In the present invention, the acoustic wave modulation may be amplitude, phase or frequency modulation and the occurrence of a particular location for a tag is then determined by correlating the incoming waveform from a tag with the expected waveform from the tag. This operation is accomplished using one of a number of devices such as surface acoustic wave (SAW) devices, matched analog or digital filters or filter banks.

Spatial information is obtained from spatial algorithms included as part of the travel-path algorithms. For example, repetitive travel-path measurements taken with differing acoustic frequencies provide information as to the width of the travel-path in the vicinity of the locator, thus informing the user, for example, of the existence of a partially closed door or other narrow opening. This enhancement finds particular application in robotics and unattended location systems. Significant also are measurements of the differences in travel times of the acoustic waves, such measurements also providing spatial information.

An industrial application of the invention employs two or more tags placed on the extremities of a large item. With such placement, orientation information is provided and is useful for robotics and other automated applications.

Further utility is achieved by placing the locator within a backpack or other article worn by a user while arranging the transducers and display in a helmet or similar headware such that a location display is visible to the user. This arrangement allows the user to locate and retrieve items by moving in the direction indicated by the helmet mounted display.

Still further, in one embodiment, the locator acoustic transducers are acoustic receivers. Operation of the locator is then in reverse fashion to the operation previously described where the acoustic transducers are transmitters. With such structure, the locator commands the target tag to transmit acoustic signals. The locator then listens with the acoustic receivers for the acoustic signals thereby locating the tag in a manner analogous to that described.

While the invention has been described with respect to portable locating devices, such description does not preclude fixed locators. A fixed locator provides both coarse and fine location information to one or more of a plurality of tagged items. Control of such a system can be by remote computing equipment, thus implementing an efficient, rapid inventory and location system for security and asset management purposes.

While the invention has been particularly shown and described with reference to preferred embodiments thereof it will be understood by those skilled in the art that various changes in form and details may be made therein without departing from the spirit and scope of the invention.

We claim:

1. A communication system including distance measuring apparatus to determine the distance from a first location to one or more of a plurality of second locations in a communication region comprising:

a locator at said first location including;
  locator acoustic means including locator acoustic transmitter means for transmitting a first acoustic frequency signal commencing at a first time;
  locator memory for storing locator sequencing code including a broadcast command and a directed command;
  locator processor means connected for accessing said locator memory and for processing said locator sequencing code to sequence said broadcast command and said directed command;
  locator radio transceiver means connected to said locator processor means for sending and receiving communications in said communication region over a common radio frequency communication channel including sending said broadcast command and said directed command and including sending a locator radio frequency signal to identify said first time;

a plurality of tags, each of said tags at one of said second locations and each including,
  a tag memory for storing information including tag sequencing code;
  a tag transceiver for sending and receiving radio frequency communications to and from said locator radio transceiver means over said common communication channel, for receiving said locator radio frequency signal and for indicating a tag representation of said first time when said locator radio frequency signal is received, and for sending a radio frequency tag signal to said locator radio transceiver means;
  tag acoustic means including tag acoustic receiver means for receiving said first acoustic frequency signal at a second time, wherein the second time is delayed after the first time the duration of the transmission time of said acoustic frequency signal from said first location to said second location;

a tag processor, connected to said tag transceiver to receive said broadcast command and said directed command, said tag processor including means for processing said tag sequencing code to send a response to said locator through said tag transceiver, difference determining means for determining the time difference between said tag representation of said first time and said second time to provide a time difference measurement, and means for processing said tag sequencing code to cause said tag transceiver to send said time difference measurement to said locator as said radio frequency tag signal in response to receipt of said directed command whereby the distance between the first location and the second location is determined as a function of said time difference measurement.

2. The communication system of claim 1 wherein each of said tags includes a controllable power means for providing power to said tag transceiver in a low-power state for a sleep mode and in a normal-power state for an awake mode where said tag processor controls said power means to select said low-power state or said normal-power state.

3. The distance measuring apparatus of claim 1 wherein, said acoustic frequency signal has a propagation velocity, and said processor means includes means for multiplying said time difference measurement by said propagation velocity to determine the distance to said second location from said first location.

4. The distance measuring apparatus of claim 1 wherein said locator radio transmitter means includes means for modulating said locator radio frequency signal to mark said locator radio frequency signal with said first time;

tag radio receiver means in said tag radio means includes means to detect the modulation of said radio frequency signal to form said tag representation of said first time when said modulation is detected to enable said time difference measurement to be precisely determined.

5. The distance measuring apparatus of claim 1 wherein said locator acoustic transmitter means includes means for modulating said acoustic frequency signal to mark said acoustic frequency signal;

said tag acoustic receiver means in said tag acoustic means includes means to detect the modulation of said acoustic frequency signal to form a tag representation of said second time when said modulation is detected to enable said time difference measurement to be precisely determined.

6. The distance measuring apparatus of claim 1 wherein said locator radio frequency signal has an origination time offset from said first time by a time origination factor whereby the distance between said first location and said second location is determined as a function of said time difference measurement less said time origination factor.

7. The distance measuring apparatus of claim 1 wherein said locator radio means is responsive to trigger means at another location remote from said first location to trigger transmitting said acoustic frequency signal.

8. The distance measuring apparatus of claim 1 wherein, said locator acoustic means includes second locator acoustic transmitter means, at said first location, spatially offset from said first locator acoustic transmitter means for transmitting a second acoustic frequency signal commencing at a time-offset from said first time, said tag acoustic means receiving said second acoustic frequency signal at a time-offset from said second time, said processor means determining said time-offset to determine the direction of said second location from said first location.

9. The communication system of claim 1 wherein, said broadcast command requests tag identifiers from all of said tags;

for each tag, said tag processor sends a tag identifier with said response upon receipt of said broadcast command;

for each tag for which said locator receives a tag identifier, said locator processor sends said directed command to acknowledge that said tag identifier has been received.

10. The communication system of claim 9 wherein, said broadcast command requests all tags but one specific tag to go to said sleep mode;

for each tag except said one specific tag, said tag processor upon receipt of said broadcast command causes said tag to go to said sleep mode;

for said specific tag, said locator processor means sends said directed command to command an action by said specific tag;

said tag processor for said specific tag upon receipt of said directed command sends said response including the tag identifier to said locator.

11. The communication system of claim 9 wherein said locator includes wake-up means for sending a wake-up signal to said tags and wherein each of said tags includes wake-up detection means connected to said tag transceiver and responsive to said wake-up signal from said locator for switching to said normal-power state.

12. The communication system of claim 9 wherein said tag transceiver in each of said tags includes, a radio frequency transmitter;

a radio frequency receiver;

an antenna connected to said transmitter and receiver.

13. The communication system of claim 9 wherein each of said tags has a unique tag identifier and said locator collects the tag identifiers from tags in the communication region using communications between said locators and said tags during a plurality of collection periods, said locator having in said locator code;

synchronizing code for sending synchronizing signal to said tags to initiate each of said collection periods;

bandwidth code for controlling the bandwidth of said collection periods;

each said tag having means for inhibiting sending a tag identifier after receipt of one of said acknowledge signals.

14. The communication system of claim 9 wherein each of said tags has a unique tag identifier and said locator collects the tag identifiers from tags in the communication region using communications between said locators and said tags during a plurality of collection periods, said locator having in said locator sequencing code;

synchronizing code for sending synchronizing signals to said tags to initiate each of said collection periods;

bandwidth code for controlling the bandwidth of said collection periods;

each said tag having means for inhibiting sending a tag identifier after receipt of one of said acknowledge signal and for sending said tag identifier only once for each of said collection periods.

15. The distance measuring apparatus of claim 1 wherein said distance is measured between said first location and each second location of a subset of a plurality of second locations, each second location of said subset having a processor for separately determining a respective time difference measurement and each second location having tag radio transmitter means as part of said tag radio means for separately communicating said respective time difference measurement back to said first location in response to being interrogated.

16. The distance measuring apparatus of claim 15 wherein each processor includes means for separately controlling the communicating of said time difference measurement back to the first location after a time delay time predetermined for each of said plurality of second locations of a subset.

17. The distance measuring apparatus of claim 1 wherein, said locator acoustic means includes second locator acoustic transmitter means, at said first location, spatially offset from said first locator acoustic transmitter means for transmitting a second acoustic frequency signal commencing at a time-offset from said first time, said tag acoustic means receiving said second acoustic frequency signal at a time-offset from said second time, said processor means determining said time-offset from said second time to determine the direction of said second location from said first location.

18. The distance measuring apparatus of claim 1 wherein a travel-path from said first location to said second location is determined by said processor means determining said distance a plurality of times to form a plurality of distances and averaging said plurality of distances.

* * * * *

UNITED STATES PATENT AND TRADEMARK OFFICE
CERTIFICATE OF CORRECTION

PATENT NO. : 5,528,232
DATED : June 18, 1996
INVENTOR(S) : Vikram VERMA, et al.

It is certified that error appears in the above-indentified patent and that said Letters Patent is hereby corrected as shown below:

Column 1, line 20, insert the following before the BACKGROUND OF THE INVENTION:

--GOVERNMENT RIGHTS

This invention was made with U.S. Government support under Contract N00600-91-C-1551 awarded by Naval Supply Systems Command. The U.S. Government has certain rights in the invention.--

Signed and Sealed this

Third Day of September, 1996

Attest:

BRUCE LEHMAN

*Attesting Officer*   Commissioner of Patents and Trademarks